United States Patent
Nakano et al.

(10) Patent No.: US 10,616,735 B2
(45) Date of Patent: Apr. 7, 2020

(54) DATA UPDATE SYSTEM, REMOTE CONFIGURATION DEVICE AND DATA UPDATE METHOD

(71) Applicant: ICOM INCORPORATED, Osaka-shi, Osaka (JP)

(72) Inventors: Akira Nakano, Osaka (JP); Yuma Oda, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days.

(21) Appl. No.: 15/762,218

(22) PCT Filed: Nov. 18, 2016

(86) PCT No.: PCT/JP2016/084201
§ 371 (c)(1),
(2) Date: Mar. 22, 2018

(87) PCT Pub. No.: WO2017/086415
PCT Pub. Date: May 26, 2017

(65) Prior Publication Data
US 2018/0249309 A1 Aug. 30, 2018

(30) Foreign Application Priority Data
Nov. 18, 2015 (JP) .................................. 2015-225983

(51) Int. Cl.
*H04W 4/50* (2018.01)
*G06F 13/00* (2006.01)
(Continued)

(52) U.S. Cl.
CPC ................ *H04W 4/50* (2018.02); *G06F 8/65* (2013.01); *G06F 9/44505* (2013.01);
(Continued)

(58) Field of Classification Search
CPC .......... H04W 4/50; G06F 9/445; G06F 13/00; H04M 3/56; H04M 11/00
See application file for complete search history.

(56) References Cited

U.S. PATENT DOCUMENTS

2006/0178161 A1 8/2006 Jung
2008/0104215 A1* 5/2008 Excoffier ............ H04L 67/1095
709/223
(Continued)

FOREIGN PATENT DOCUMENTS

JP 2005-348230 A 12/2005
JP 2006-25457 A 1/2006
(Continued)

OTHER PUBLICATIONS

"IP Transceiver System IP-500H" by Icom Incorporated [online], <URL: https://www.icom.co.jp/products/land_mobile/products/ip_transceiver/IP500H/index.html>, retrieved on Mar. 7, 2018, which is discussed on p. 1-2 of the specification.
(Continued)

*Primary Examiner* — Marisol Figueroa
(74) *Attorney, Agent, or Firm* — Muncy, Geissler, Olds & Lowe, P.C.

(57) ABSTRACT

[Problem] A data update system of the present invention allows a user to update a data of a server while security of the server is maintained.
[Solution] The present invention is provided with a main server for storing a configuration data, a terminal device to which update data for updating a part of or whole of the configuration data is input, a remote configuration device for communicating with the terminal device for receiving and storing the update data input to the terminal device, and a communication server for communicating with the main server and the remote configuration device. The remote configuration device transmits the update data received from
(Continued)

the terminal device to the communication server. The communication server updates the configuration data stored in the main server with the update data received from the remote configuration device.

9 Claims, 6 Drawing Sheets

(51) Int. Cl.
    *H04M 11/00* (2006.01)
    *G06F 8/65* (2018.01)
    *G06F 9/445* (2018.01)
    *G06F 8/658* (2018.01)
    *H04Q 9/00* (2006.01)
    *H04M 3/56* (2006.01)
    *H04L 12/24* (2006.01)
    *H04W 4/00* (2018.01)
    *H04W 4/10* (2009.01)

(52) U.S. Cl.
    CPC ............ *G06F 13/00* (2013.01); *H04L 41/082* (2013.01); *H04M 3/56* (2013.01); *H04M 11/00* (2013.01); *H04Q 9/00* (2013.01); *H04W 4/00* (2013.01); *G06F 8/658* (2018.02); *H04L 41/5054* (2013.01); *H04W 4/10* (2013.01)

(56) References Cited

U.S. PATENT DOCUMENTS

| | | | |
|---|---|---|---|
| 2010/0318582 A1* | 12/2010 | Nimura | G06Q 10/06 707/805 |
| 2011/0072421 A1* | 3/2011 | Parry | G06F 8/65 717/168 |
| 2013/0031542 A1 | 1/2013 | Arcilla et al. | |
| 2013/0198349 A1 | 8/2013 | Wright et al. | |
| 2014/0317613 A1* | 10/2014 | Appiah | G06F 8/658 717/172 |
| 2015/0254067 A1* | 9/2015 | Nigam | G06F 8/61 717/175 |
| 2018/0324037 A1* | 11/2018 | Nakano | G06F 13/00 |

FOREIGN PATENT DOCUMENTS

| | | |
|---|---|---|
| JP | 2014-52793 A | 3/2014 |
| WO | 2017/006833 A1 | 1/2017 |

OTHER PUBLICATIONS

International Search Report of PCT/JP2016/084201.
Supplementary European search report for the corresponding EP application No. 16866415 dated Jul. 4, 2019.

* cited by examiner

DATA UPDATE SYSTEM, REMOTE CONFIGURATION DEVICE AND DATA UPDATE METHOD

TECHNICAL FIELD

The present invention relates to a data update system, a remote configuration device and a data update method which allows a user to update data of a server while security is maintained.

BACKGROUND ART

A voice communication system, in which a server (a call controller) is installed on a network and voice communication is conducted via this server, is put into practice (Non-Patent literature 1, for example). In such voice communication system, a second server (provisioning server) is installed on the network in order to configure a provisioning data (configuration data) in a communication terminal for defining an operation of a communication terminal having a shape of a transceiver. When the communication terminal is powered on, the communication terminal is connected to the network and makes an access to the network, downloads configuration data (provisioning data) from the provisioning server and stores it in a memory (provisioning processing). The communication terminals is capable of PTT communication via call controller using the data.

In the voice communication system, a plurality of the communication terminals are possessed by the users of the system (a business enterprise using a communication service, for example), but the call controller or the provisioning server is managed by an provider of the system (a provider of the communication system). Individual provisioning data is configured in each of the plurality of communication terminals. The configuration of a part of or the whole of the communication terminal may need to be changed during an operation of the voice communication system.

Conventionally, an access path to the server and authority to update the provisioning data have not been provided or given to the system user in order to maintain security of the voice communication system. That is, the system user could not update the configuration data of the user-owned communication terminal by accessing the server. Thus, the system provider has written the configuration data of all the communication terminals of the system users in the provisioning server. The writing of the configuration data in the provisioning server was also needed at a change of the operation form after the operation started in addition to start of the operation of the voice communication system.

CITATION LIST

Non-Patent Literature

[Non-Patent Literature 1] "IP Transceiver System IP-500H" by Icom Incorporated [online], [searched on Nov. 4, 2015, Internet <URL: https://www.icom.co.jp/products/land mobile/pro ducts/ip_transceiver/IP500H/index.html>

Problems to be Solved by Invention

By way of the aforementioned operation form, although security of the provisioning server can be maintained, the system user needed to contact and request the system provider to change the configuration even an insignificant change every time. Then, the system provider needed to change the configuration even the insignificant change for the system user. Thus, application of the configuration change took time, and a rapid change of the operation form could not be made. For the system provider, a work is incurred at each configuration change, which increases an operation management cost of the system.

The present invention has an object to provide the data update system, the remote configuration device and the data update method which allow user to update the data of the server while security of the server is maintained.

SUMMARY OF INVENTION

The present invention is provided with a main server for storing the configuration data, a terminal device to which an update data for updating a part of or the whole of the configuration data is input, the remote configuration device for communicating with the terminal device, receiving and storing the configuration data input in the terminal device, and a communication server for communicating with the main server and the remote configuration device. The remote configuration device transmits the update data received from the terminal device to the communication server. The communication server updates the configuration data which is stored in the main server with the update data received from the remote configuration device.

The remote configuration device is provided with a first protocol stack for managing transmission/reception process of a communication packet to/from the main server for storing the configuration data or the communication server, a second protocol stack for managing transmission/reception process of a communication packet to/from the terminal device to which the update data is input so as to update a part of or the whole of the configuration data, and a control unit for making the update data conveyed by a first communication packet conforming to the first protocol stack, and transmitting the first communication packet to the main server or the communication server, when a second communication packet conveying the update data from the terminal device has received.

The remote configuration device transfers the update data input from the terminal device, but does not relay the communication between the terminal device and the communication server. The communication server updates the configuration data by transmitting the update data received from the remote configuration device to the main server, but does not relay the communication between the remote configuration device and the main server.

Advantageous Effect of Invention

According to the present invention, the service for updating the configuration data stored in the main server can provide for the user (client) while security of the server is maintained.

DETAILED DESCRIPTION OF THE EMBODIMENT

Figure 1:
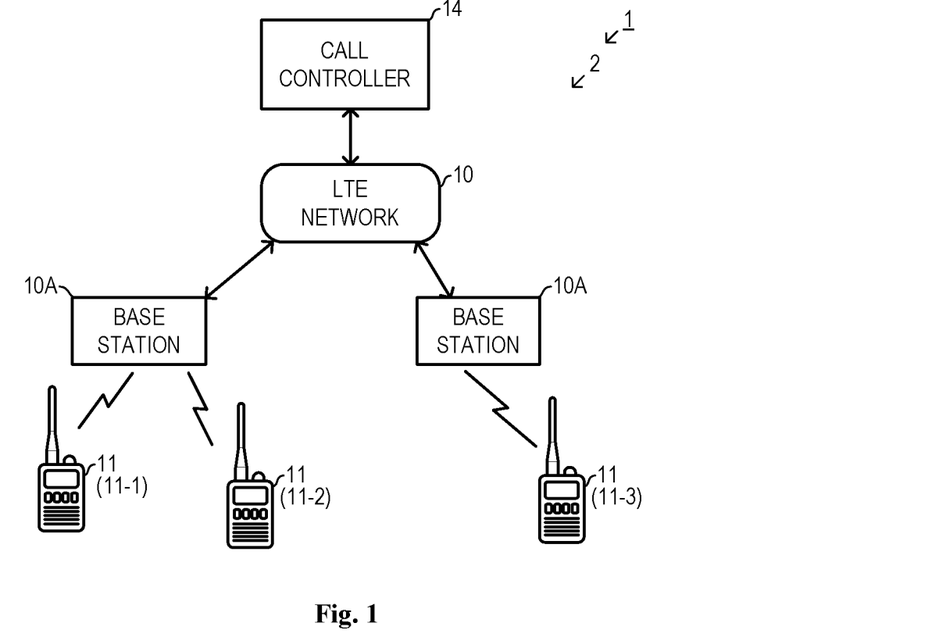
FIG. 1 is a structure diagram of a call control system of a voice communication system which is an embodiment of the present invention.
Figure 4:
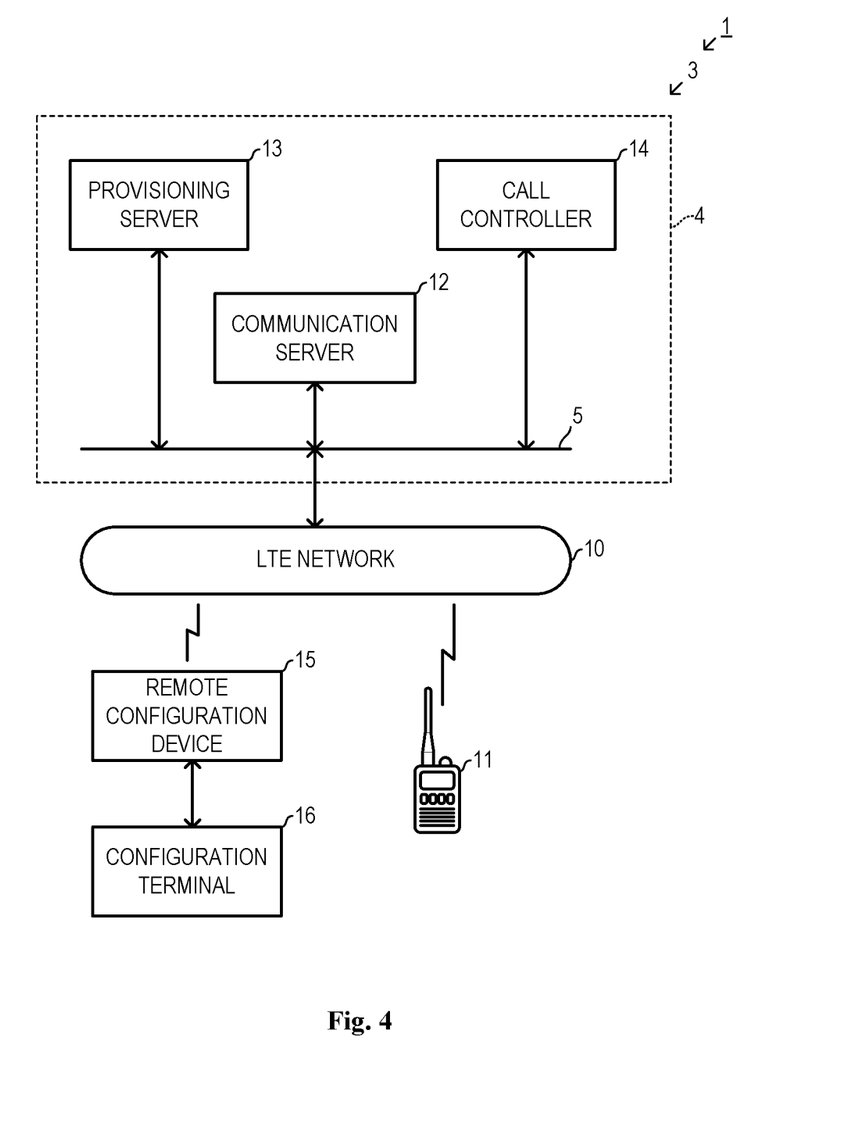
FIG. 4 is a structure diagram of a terminal configuration system of the voice communication system.

A voice communication system of this invention will be described by referring to the attached drawings. FIG. 1 is a configuration diagram of a call control system 2 of the voice communication system which is an embodiment of this invention. FIG. 4 is a configuration diagram of a terminal configuration system 3 of the voice communication system.

As illustrated in FIG. 1, in the call control system 2, communication terminals 11 (11-1, 11-2, and 11-3) conducts voice communication with each other via a call controller 14. An LTE network 10 which is the communication network for mobile phone is used for as communication infrastructure. The LTE network 10 has a base station 10A which is a wireless communication base. The communication terminal 11 accesses the LTE network 10 by communicating with a base station 10A. In the present invention, the call controller 14 illustrated in FIG. 1, a communication server 12 illustrated in FIG. 4 and a provisioning server 13 are configured in the closed network where nobody except for the system provider (provider of communication service) can access. Thus, a client (system user, enterprise using a communication service) described later also cannot access the provisioning server 13. The communication infrastructure is not limited to the LTE network.

Figure 2:
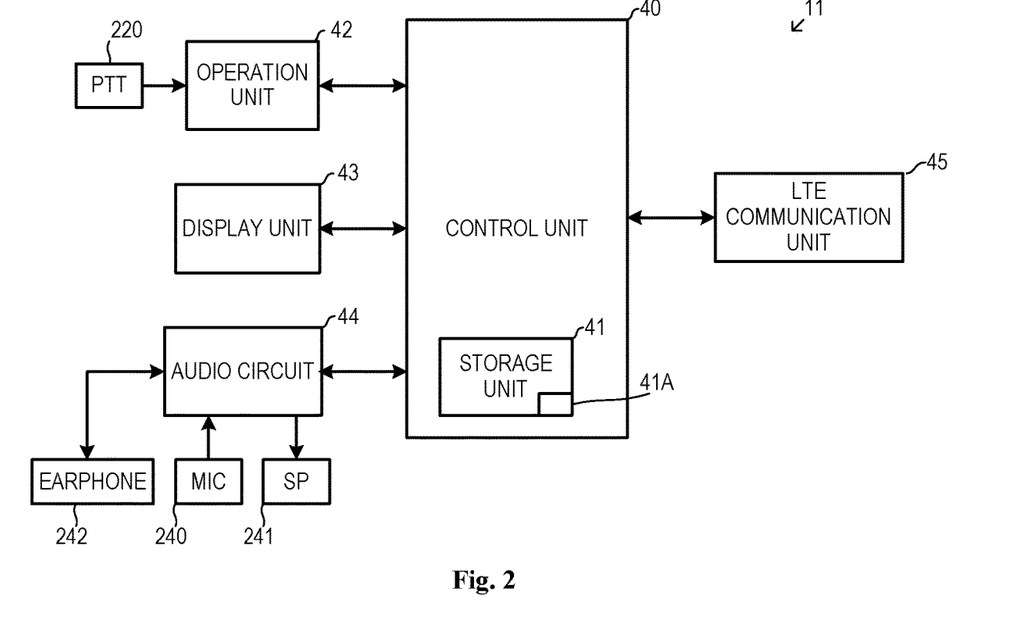
FIG. 2 is a block diagram of a communication terminal.
Figure 3:
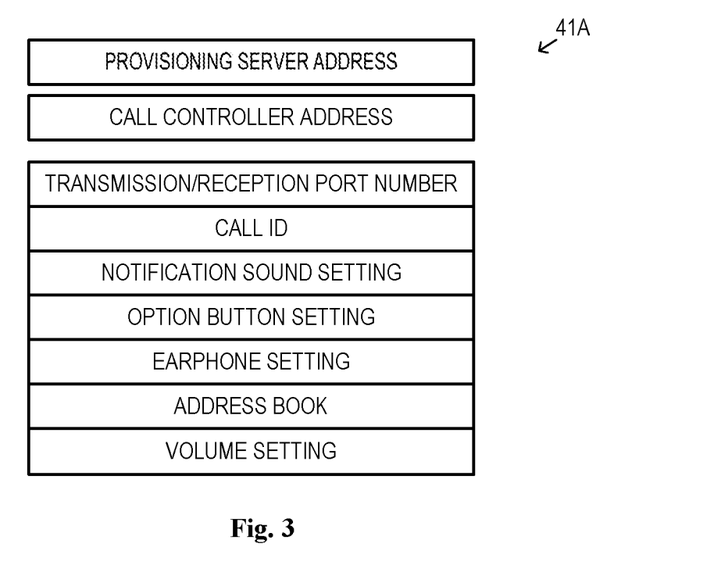
FIG. 3 is a diagram illustrating provisioning data (configuration data) configured in the communication terminal.

FIG. 2 is a block diagram of the communication terminal 11. The communication terminal 11 has an appearance of a handy transceiver as illustrated in FIG. 1, but functionally, it is a wireless network device which transmits/receives a voice signal via the base station 10A of the LTE network 10. A control unit 40 for controlling an operation of the device is constituted by a microprocessor. The control unit 40 has a storage unit 41 in which various types of data is stored. The storage unit 41 has a provisioning data storage area 41A. In the provisioning data storage area 41A, a various type of the provisioning data (configuration data) as illustrated in FIG. 3 is stored. An operation unit 42, a display unit 43, an audio circuit 44, and an LTE communication unit 45 are connected to the control unit 40. The operation unit 42 includes a key switch such as a PTT switch 220 and receives an operation of the user and inputs its operation signal to the control unit 40. The display unit 43 includes a liquid crystal display. The liquid crystal display displays an identification number of a communication partner selected by the operation of the user or the identification number of the communication partner whose incoming call was received.

The audio circuit 44 has a microphone 240 and a speaker 241. The control unit 40 decodes the received voice signal and inputs it to the audio circuit 44. The audio circuit 44 converts this decoded audio signal to an analog signal and outputs it from the speaker 241. Moreover, the audio circuit 44 also converts the voice signal input from the microphone 240 to a digital signal and inputs it to the control unit 40. The control unit 40 makes this digital audio signal into a voice packet and inputs it to the LTE communication unit 45. The LTE communication unit 45 has a circuit for conducting wireless communication in LTE communication mode and transmits the packet input from the control unit 40 toward the base station 10A and then inputs a packet received from the base station 10A to the control unit 40. An earphone connector 242 is provided in the audio circuit 44. When an earphone microphone (not shown) is connected to an earphone connector 242, the microphone 240 and the speaker 241 provided with the communication terminal 11 body stop their functions, and a microphone of the earphone microphone and a speaker (earphone) of the earphone microphone are enabled.

When the user inputs voice toward the microphone 240 while pressing the PTT switch 220 by using the communication terminal 11 structured as above, the communication terminal 11 edits this voice signal into a voice packet and transmits it to the call controller 14 via the base station 10A.

FIG. 3 is a diagram illustrating structure of the provisioning data storage area 41A of the storage unit 41. In the provisioning data storage area 41A, the provisioning data as below (configuration data) is stored. In this embodiment, a provisioning server address in the following data is written to non-volatile memory at shipment of the communication terminal 11 and is not included in the provisioning data.

Provisioning server address: IP address of the provisioning server 13 illustrated in FIG. 4

Call controller address: IP address of call controller 14

Transmission/reception port number: transmission/reception port number of the call controller 14 when communicating with the call controller 14

Call ID: Call ID of the communication terminal 11 itself

Notification sound setting: Selection information of notification sound for an incoming call or the like.

Option button setting: Assignment information of function to option buttons provided in the operation unit 42

Earphone setting: Setting information whether or not full duplex communication is to be conducted when the earphone microphone is connected.

Address book: Call ID list of communication terminals 11 which can be called.

Volume setting: Volume setting information of communication voice

In the aforementioned data, the provisioning server address and the call controller address are data commonly used in the communication terminal 11 in the same voice communication system. The call ID, the transmission/reception port number, the notification sound setting, the option button setting, the earphone setting, the address book, and the volume setting are individual data set individually for each of the communication terminal 11. The call ID is unique to each of the communication terminal 11, and cannot be changed from the communication terminal 11. The provisioning data except for the provisioning server address, the call controller address, and the port number can be changed by the operation of the communication terminal 11 by the user.

FIG. 4 is a diagram illustrating structure of the terminal configuration system 3 for writing the provisioning data in the communication terminal 11. In a communication center 4, the communication server 12 and the provisioning server 13 is installed in addition to the aforementioned call controller 14. Each of the server and the controller is respectively connected to the LTE network 10. The communication terminal 11 for conducting the voice communication accesses the provisioning server 13 and receives the provisioning data when power is on, that is upon start of the operation. The received provisioning data is written in the provisioning data storage area 41A. The communication terminal 11 can access the call controller 14 and communicate with other communication terminal 11, by referring the provisioning data written in the provisioning data storage area 41A. The provisioning server 13 and the call controller 14 correspond to the main server of the present invention.

In the provisioning server 13, the provisioning data for configuring to a plurality of the communication terminals 11 (11-1, 11-2, and 11-3) shown in FIG. 1 are stored respectively. The provisioning data is input with the configuration terminal 16 by the person in charge of configuration. The configuration terminal 16 consists of a personal computer, for example. The configuration terminal 16 corresponds to the terminal device according to the present invention. The person in charge of configuration is a person who is in charge of configuration of the provisioning data to the voice communication system 1 in the client (a business enterprise using a communication service) who possess a plurality of the communication terminals 11, but not necessary to be the system provider (a provider of the communication service) who possess the call controller 14, and the provisioning server 13. The provisioning data input from the configuration terminal 16 (an update data, hereinafter) is transmitted to the remote configuration device 15, and then stored in the remote configuration device 15. The remote configuration device 15 transmits the stored update data to the communication server 12 over the LTE network 10. It should be noted that the remote configuration device 15 can communicate only with the communication server 12 over the LTE network 10. The communication server 12 can communicate with the provisioning server 13 and the call controller 14 via an internal network 5. The communication server 12 updates the provisioning data, which is stored in the provisioning server 13, with the update data received from the remote configuration device 15. A system administrator who is a supervisor of the person of being in charge of the configuration in the client can also input a data for updating the configuration in the call controller 14 with the configuration terminal 16. The remote configuration device 15 transmits the input change data to the communication server 12. The communication server 12 updates the configuration of the call controller 14 with the update data received from the remote configuration device 15. In the call controller 14, a list of the call ID of the communication terminals 11 or the like are stored.

Between the remote configuration device 15 and the communication server 12, an update data and a command for transmitting/receiving this update data are transmitted/received. However, the command generated by operations of the configuration terminal 16 will not reach the communication terminal 12 via a remote configuration device 15 and the LTE network 10. As the remote configuration device 15 can communicate only with the communication server 12, the remote configuration terminal 15 cannot transmit the command directly to the provisioning server 13 and the call controller 14 from out of the communication center 4.

Figure 5:
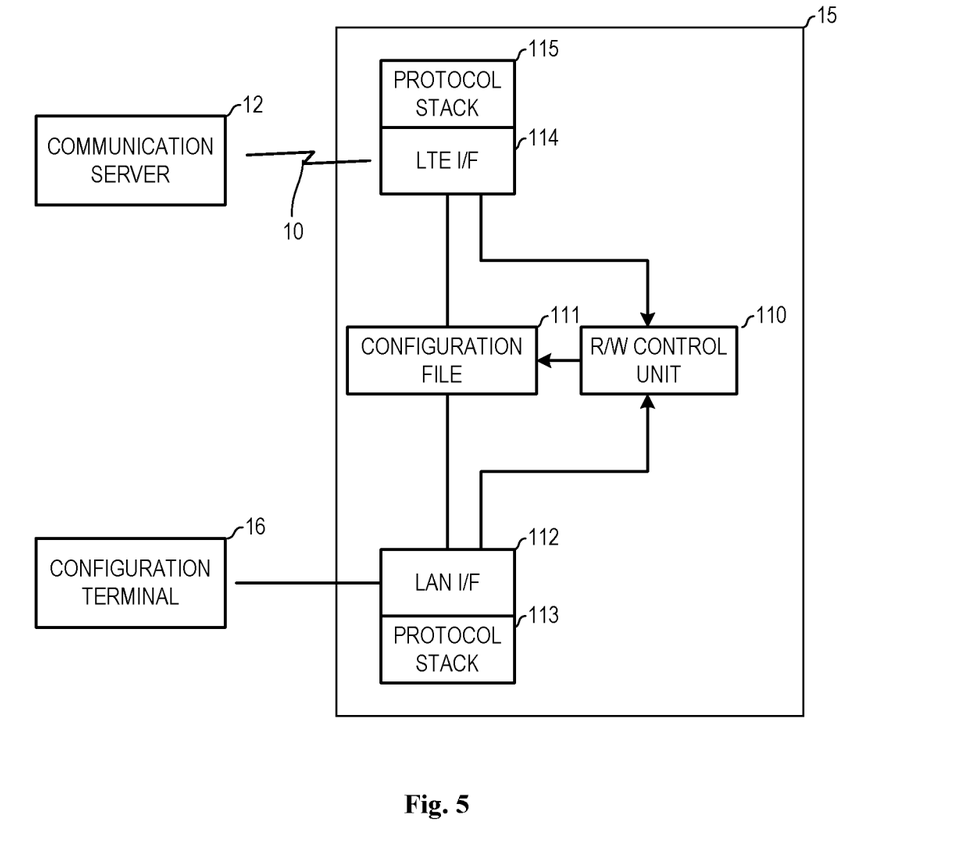
FIG. 5 is a block diagram of a remote configuration device.

FIG. 5 is a block diagram of the remote configuration device 15. The remote configuration device 15 connects the configuration terminal 16 to the communication server 12 (LTE network 10). The remote configuration terminal 15 has a LAN interface 112 which communicates with the configuration terminal 16, a LTE interface 114 which communicates with the communication server 12 over the LTE network 10, an R/W control unit 110, and a configuration file storage unit 111.

The LAN interface 112 has a protocol stack 113 (second protocol stack) for communicating with the configuration terminal 16. This protocol stack 113 may be those for executing a protocol conforming to a general LAN standard. The LTE interface 114 has a protocol stack 115 (first protocol stack) for communicating with the communication serer 12 over the LTE network 10. This protocol stack 115 conforms to standard of the LTE network 10. The configuration file storage unit 111 stores an update data for updating the provisioning data in the provisioning server 13. The R/W control unit 110 controls read/write to the configuration file storage unit 111.

As described above, the LAN interface 112 side and the LTE interface 114 side share the configuration file storage unit 111 but they are structured not to relay the communication, and the configuration terminal 16 cannot directly transmit a command to the communication terminal 12. On the other hand, since it is structured that the configuration terminal 16 (or a LAN to which the configuration terminal 16 is connected) is invisible from the LTE network 10 side, the configuration terminal 16 (or the LAN to which the configuration terminal 16 is connected) is not accessed from the LTE network 10.

It should be noted that the same configuration file as a provisioning data table for whole of the communication terminals 11 which is stored in the provisioning server 13 can be stored in the configuration file storage unit 111. In this case, when the person in charge of configuration updates the provisioning data in the communication terminal 11, the configuration file in the remote configuration device 15 can be updated from the configuration terminal 16, and then the update contents can be transferred to the provisioning server via the communication server 12. That is also same as the data to be configured in the call controller 14.

Figure 6:
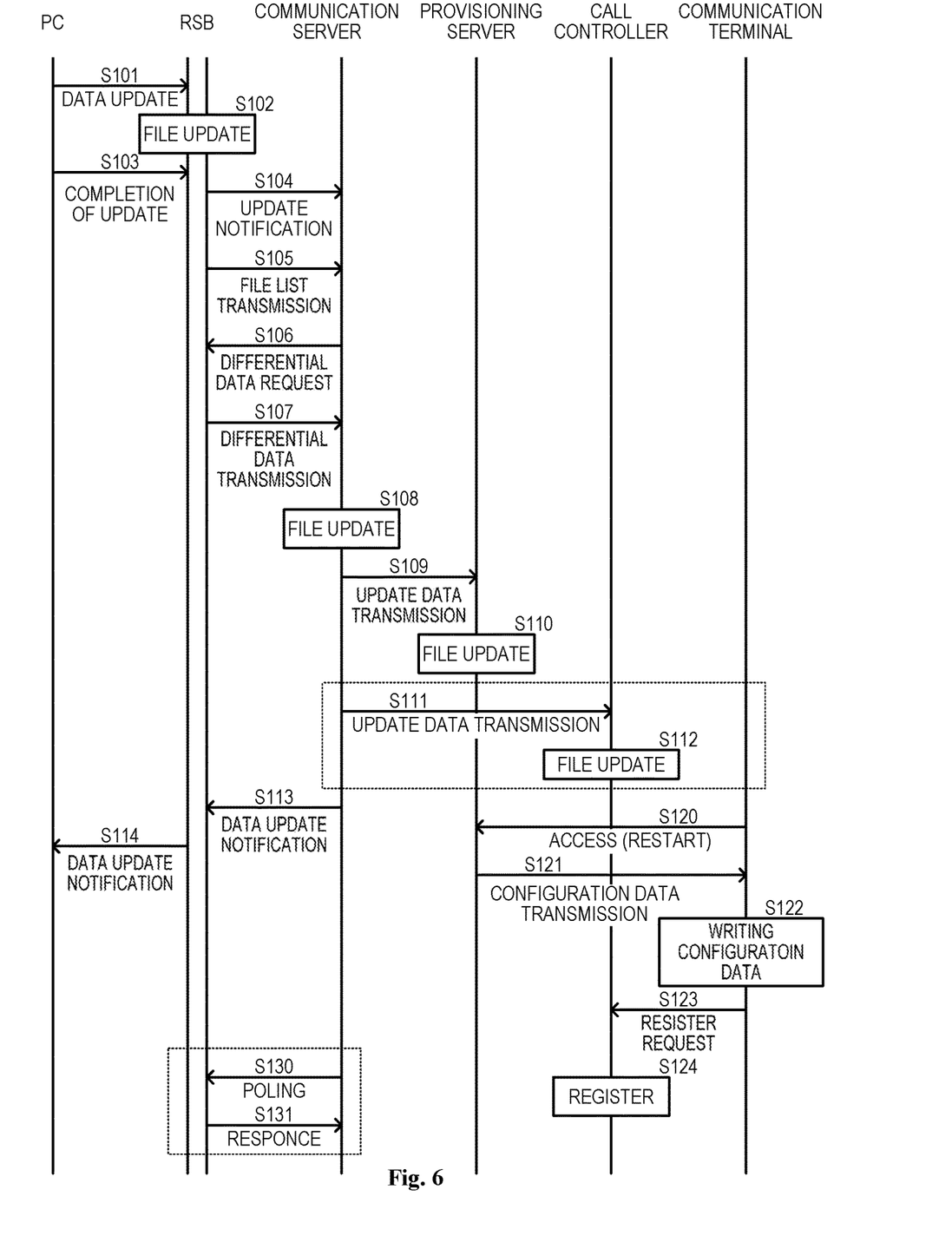
FIG. 6 is a diagram for describing a procedure of the provisioning data update in the voice communication system.

The operation process of the configuration system 3 including the remote configuration device 15 of abovementioned structured is described by referring the FIG. 6. The remote configuration device (RSB) 15 operates depending on the operation from the configuration terminal (PC) 16. Here, it is also described that the provisioning data table, which is stored in the provisioning server 13, and a registration data table of the call controller 14 are stored as the configuration file which can be saved in the communication server 12 and the remote configuration device 15, and that the part of them are updated from the configuration terminal 16.

The person in charge of configuration who is an operator of the configuration terminal 16 updates the provisioning data and the registration data (hereinafter referred to simply as a provisioning data) which are stored in the remote configuration device 15 by operating the configuration terminal 16 (S101). When A voice communication system 1 is in the initial state or the like, the person in charge of configuration can update (newly write) the whole of the provisioning data of each communication terminal 11. The remote configuration device 15 updates the configuration file stored in the configuration file storage area 111 with the contents input from the configuration terminal 16 (S102). When the update of the provisioning data has been completed, the person in charge of configuration gives a notification of the update end to the remote configuration device 15 by operating the configuration terminal 16 (S103). Abovementioned processing is conducted at the LAN interface 112 side of the configuration terminal 16 and the remote configuration device 15.

When the remote configuration device 15 receives the notification of the configuration completion from the configuration terminal 16, it accesses the communication server 12, and gives a notice which the provisioning data has been updated (S104), and transmits a configuration file list, to which the update history is entered, to the communication server 12 (S105). The communication server 12 transmits the message for requesting to transmit a differential configuration file (update data) updated on this time based on the list of the configuration file to the remote configuration device 15 (S106). The remote configuration device 15 transmits the requested differential file (updated data) to the communication server 12 (S107).

The communication server 12 updates the configuration file stored in itself with the update data received from the remote configuration device 15 (S108). It also transmits this update data to the provisioning server 13 (S109). The provisioning server 13 receives this update data, and updates its own configuration file (S110).

When the data configured in the call controller 14 is updated, the communication server 12 accesses the call controller 14, and transmits the update data (S111). The call controller 14 receives this data, and updates its own registration data file (S112). The update of the provisioning data has been completed as above. The communication server 12 gives a notification of update completion (S113), and the remote configuration device 15 which received the notification gives the notification of update completion to the configuration terminal 16 (S114). The configuration terminal 16 can display the wording such as the completion of the provisioning data update or the like according to the notification of update completion.

After the abovementioned process, when the communication terminal 11 is restarted (or is powered on), it accesses to the provisioning server 13 (S120). The provisioning server 13 reads out the provisioning data for this accessed communication terminal, and transmits it to the communication terminal 11 (S121). The communication terminal 11 receives this provisioning data, and writes it in its own provisioning data storage area 41A (S122). The communication terminal 11 accesses the call controller 14 with this provisioning data, and transmits the registration request to the call controller 14 (S123). When the call controller 14 receives the registration request, and if the request is the registration request from the communication terminal 11 registered in its own terminal table, the call controller 14 registers the communication terminal 11, and enables the voice communication by using the call controller 14 as a server (S124).

It should be noted that in abovementioned process, the communication server 12 requests the update data to the remote configuration device 15 when the remote configuration device 15 gives a data update notification, but even if the data update notification is not provided, the communication server 12 may perform polling to the remote configuration device 15 regularly (S130), and the remote configuration device 15 may respond to the polling (S131).

In this embodiment, the voice communication system 1 using the LTE network 10 is described, but the network for use is not limited to the LTE network 10.

In this embodiment, an example for updating the provisioning data of the communication terminal 11 which stored in the provisioning server 13 or the registration data which stored in the call controller 14 is described, but the updated data is not limited to the provisioning data of the communication terminal 11. The provisioning data or the registration data correspond to the configuration data of the present invention.

REFERENCE NUMERALS 1 voice communication system
2 call control system
3 terminal configuration system
10 LTE network
11 communication terminal
12 communication server
13 provisioning server (main server)
14 call controller (main server)
15 remote configuration device
16 configuration terminal (terminal device)
41A provisioning data storage area
111 configuration file storage unit

What is claimed is:

1. A data update system comprising:
 a server system that is composed with a main server for storing a configuration data and a communication server for communicating with the main server;
 a terminal device that is input an update data for updating a part of or the whole of the configuration data stored in the main server;
 a remote configuration device for communicating with the terminal device through a terminal network and with the communication server through a server network, receiving and storing the update data input in the terminal device wherein the terminal network and the server network are regulated in different protocols; wherein
 the remote configuration device is configured with
  a configuration file that includes the same contents as that of the configuration data wherein each of data in the configuration file corresponds to one of data in the configuration data stored in the main server,
  a server interface that is configured to communicate with the communication server through the server network, and
  a terminal interface that is configured to communicate with the terminal device through the terminal network,
 the remote configuration device allows the terminal device to access the configuration file therein through the terminal interface, but does not allow the terminal device to access the configuration data in the main server through the server interface,
 the terminal device
  accesses the remote configuration device using the terminal interface, and
  updates one or more data of the configuration file using the input update data, creating the updated configuration file, and transmitting the updated configuration file to the remote configuration device, and
 the remote configuration device
  accesses the communication server using the server interface, and
  transmits the updated configuration file, which is updated by and transmitted from the terminal device, to the communication server, and
 the communication server updates only one or more data of the configuration data stored in the main server in correspondence with the updated configuration file, which is received from the remote configuration device, wherein the one or more data updated by the communication server correspond to the update data in the updated configuration file and the updated configuration file is transmitted from the remote configuration device in accordance with a protocol executed in the communication server.

2. The data update system according to claim 1, wherein the main server writes the configuration data to a communication terminal for conducting the voice communication.

3. The data update system according to claim 1, wherein
the remote configuration device updates the configuration file in accordance with an instruction from the terminal device, and transmits a message of a data update completion to the communication server; and
the communication server, corresponding to the message, acquires the updated configuration file as the update data from the remote configuration device, and then updates the configuration data of the main server with the configuration file.

4. The data update system according to claim 1, wherein
a plurality of the main servers are installed; and
the communication server updates the configuration data stored in each of the main servers, respectively.

5. The data update system according to claim 1, wherein the remote configuration device comprises:
a first protocol stack for managing the transmission/reception process of a communication packet to/from the communication server;
a second protocol stack for managing the transmission/reception process of the communication packet to/from the terminal device;
a control unit for reading out the update data when a second communication packet conveying the update data from the terminal device has received, making the update data conveyed by a first communication packet conforming to the first protocol stack, and transmitting the first communication packet to the communication server.

6. The data update system according to claim 1, wherein the remote configuration device comprises:
a first protocol stack for managing transmission/reception process of a communication packet to/from the main server for storing the configuration data or the communication server for relaying communication with the main server;
a second protocol stack for managing transmission/reception process of a communication packet to/from the terminal device for inputting the update data for updating a part of or the whole of the configuration data;
a control unit for reading out the update data when a second communication packet conveying the update data from the terminal device has received, making the update data conveyed by a first communication packet conforming to the first protocol stack, and transmitting the first communication packet to the main server or the communication server.

7. The data update system according to claim 6, further comprising;
a storage unit for storing a configuration file having same contents as that of the configuration data of the main server; wherein
the control unit updates the configuration file with the update data, and transmits the updated configuration file to the main server or the communication server.

8. A data update method for updating a configuration data used for a server system using a terminal device, wherein
the server system that is composed with a main server for storing the configuration data and a communication server for communicating with the main server,
the terminal device that is input an update data for updating a part of or the whole of the configuration data stored in the main server, and
a remote configuration device for communicating with the terminal device through a terminal network and with the communication server through a server network, receiving and storing the update data input in the terminal device wherein the terminal network and the server network are respectively regulated in a first protocol and a second protocol that are different, wherein
the remote configuration device is configured with
a configuration file that includes the same contents as that of the configuration data wherein each of data in the configuration file corresponds to one of data in the configuration data stored in the main server,
a server interface that is configured to communicate with the communication server through the server network, and
a terminal interface that is configured to communicate with the terminal device through the terminal network,
the remote configuration device allows the terminal device to access the configuration file therein through the terminal interface, but does not allow the terminal device to access the configuration data in the main server through the server interface,
the data update method, comprising:
accessing the remote configuration device using the terminal interface from the terminal device,
updating one or more data of the configuration file using the input update data, creating the updated configuration file,
transmitting the updated configuration file to the remote configuration device through the terminal network in accordance with the first protocol,
accessing the communication server using the server interface from the remote configuration device,
transmitting the updated configuration file to the communication server through the server network in accordance with the second protocol,
updating only one or more data of the configuration data stored in the main server, which correspond to the update data in the updated configuration file.

9. The data update method according to claim 8, wherein
the remote configuration device stores a configuration file having same contents as that of the configuration data of the main server, updates the configuration file in accordance with an instruction from the terminal device, and transmits a message of the data update completion to the communication server;
the communication server acquires the updated configuration file as the update data from the remote configuration device corresponding to the message, and then updates the configuration data of the main server by this configuration file.

* * * * *